(12) United States Patent
Lesso et al.

(10) Patent No.: US 8,159,200 B2
(45) Date of Patent: Apr. 17, 2012

(54) DC-DC CONVERTER CIRCUITS, AND METHODS AND APPARATUS INCLUDING SUCH CIRCUITS

(75) Inventors: John Paul Lesso, Edinburgh (GB); John L. Pennock, Midlothian (GB)

(73) Assignee: Wolfson Microelectronics plc, Edinburgh (GB)

( * ) Notice: Subject to any disclaimer, the term of this patent is extended or adjusted under 35 U.S.C. 154(b) by 0 days.

(21) Appl. No.: 13/184,101

(22) Filed: Jul. 15, 2011

(65) Prior Publication Data

US 2011/0273151 A1  Nov. 10, 2011

Related U.S. Application Data

(62) Division of application No. 12/615,291, filed on Nov. 10, 2009, now Pat. No. 7,994,763, which is a division of application No. 11/892,885, filed on Aug. 28, 2007, now Pat. No. 7,723,965.

(30) Foreign Application Priority Data

Aug. 31, 2006  (GB) ................... 0617139.1

(51) Int. Cl.
*G05F 1/40* (2006.01)
(52) U.S. Cl. ..................................... 323/271
(58) Field of Classification Search .................. 323/222, 323/223, 225, 267, 268, 271, 282; 363/59, 363/60, 62
See application file for complete search history.

(56) References Cited

U.S. PATENT DOCUMENTS

| | | | |
|---|---|---|---|
| 5,617,015 A | 4/1997 | Goder et al. | |
| 5,751,139 A | 5/1998 | Jordan et al. | |
| 6,462,962 B1 * | 10/2002 | Cuk | ............... 363/16 |
| 6,636,022 B2 | 10/2003 | Sluijs et al. | |
| 6,812,776 B2 | 11/2004 | Henry | |
| 7,256,568 B2 | 8/2007 | Lam et al. | |
| 7,276,886 B2 | 10/2007 | Kinder et al. | |
| 7,432,614 B2 | 10/2008 | Ma et al. | |
| 7,646,179 B2 | 1/2010 | Hagino | |

(Continued)

FOREIGN PATENT DOCUMENTS

DE  3316251 A1  11/1984

OTHER PUBLICATIONS

MAX685 Datasheet: "Dual-output (positive and negative) DC-DC converter for CCD and LCD," Maxim Integrated Products (Jun. 2003).
D. Ma et al., "Single-Inductor Multiple-Output Switching Converters with Bipolar Outputs," ISCA2001 IEEE, pp. III-301-III-304 (May 6, 2001).

(Continued)

*Primary Examiner* — Matthew Nguyen
(74) *Attorney, Agent, or Firm* — Dickstein Shapiro LLP

(57) ABSTRACT

Electrical power from an input voltage supply is converted to first and second output voltages of opposite polarities using a single inductor (L) and only four principal switches (S1, S2, S4, S6). In contrast to known circuits, none of the switches is exposed to voltages greater than the input voltage (V1). In a first type of charging cycle (FIG. 5(a)-(c)), the first output voltage (V2+) is obtained from the input voltage supply through the inductor. In a second type of charging cycle (FIG. 5 (d)-(f)), the second output voltage (V2-) is obtained from the first output voltage via the intermediate step of storing energy in the same inductor as is used in the first type of charging cycle. Auxiliary switches (S7a, S7b) can be operated in wait states between cycles of the first and second type.

18 Claims, 12 Drawing Sheets

U.S. PATENT DOCUMENTS

| | | | |
|---|---|---|---|
| 7,893,665 B2 * | 2/2011 | Belch | 323/222 |
| 2004/0135562 A1 | 7/2004 | Oden | |
| 2005/0105227 A1 | 5/2005 | Chen et al. | |
| 2007/0052395 A1 | 3/2007 | Belch | |

OTHER PUBLICATIONS

W-H Ki et al., "Single-Inductor Multiple-Output Switching Converters," PESC, pp. 226-231 (Jun. 17, 2001).

* cited by examiner

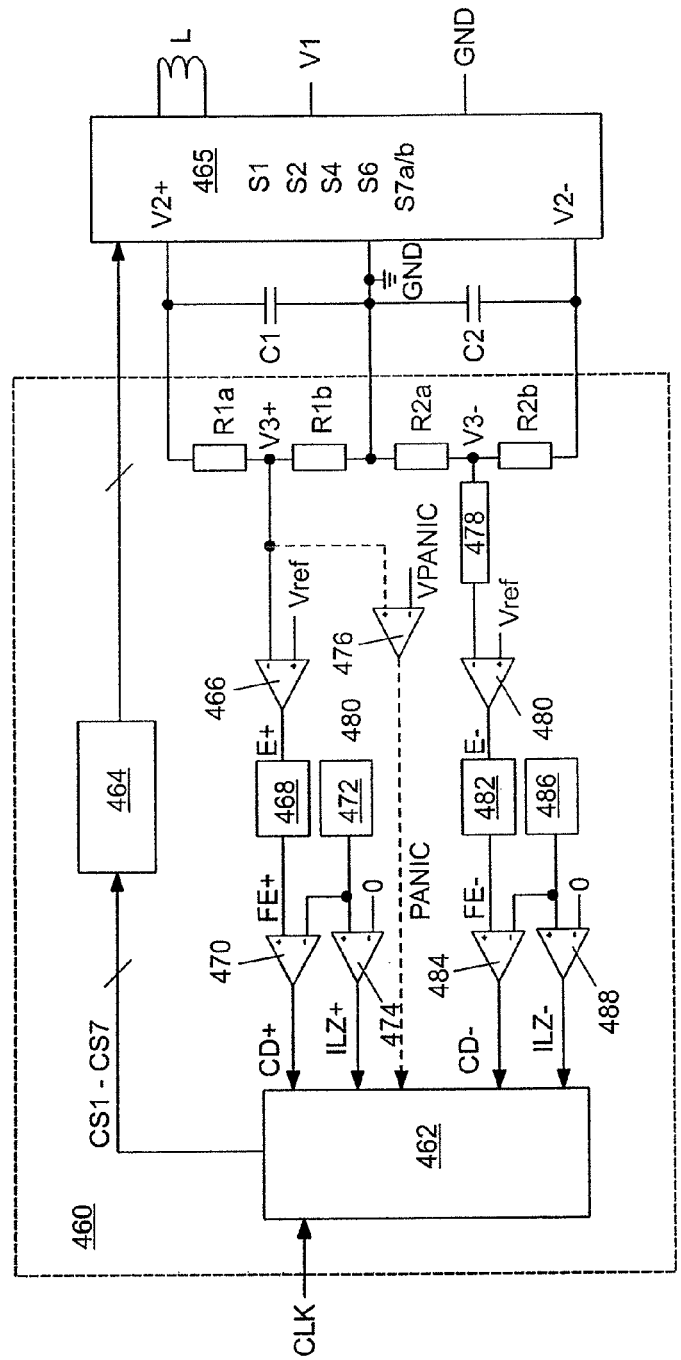
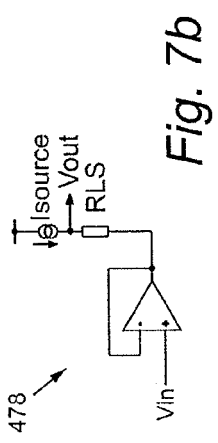
Fig. 7a
Fig. 7b

DC-DC CONVERTER CIRCUITS, AND METHODS AND APPARATUS INCLUDING SUCH CIRCUITS

This is a divisional of application Ser. No. 12/615,291, filed Nov. 10, 2009 now U.S. Pat. No. 7,994,763, which is a divisional of application Ser. No. 11/892,885, filed Aug. 28, 2007, now U.S. Pat. No. 7,723,965, the entire disclosures of which are incorporated herein by reference.

The invention relates to DC-DC converter circuits, in particular circuits for generating a split rail (dual polarity) supply from a single input voltage supply.

The invention further relates to integrated circuits for use in making such DC-DC converters and methods of operation thereof, and apparatus such as audio amplifiers including such circuits along with functional circuitry.

Modern electronic apparatuses integrate a wider range of functions, such as display, audio, digital and analogue signal processing functions. Each of these functions has its own requirements for voltage supplies, which are met with high efficiency by modern switched mode voltage converters of DC-DC and even AC-DC type. These converters use a combination of inductors, capacitors and networks of switches controlled in a predetermined sequence to translate freely between higher and lower supply voltages.

In modern times, there is a need to generate different supply voltages from those available, to suit different parts of a complex apparatus which may be highly portable, powered either by batteries or through combined signal/power interfaces (USB devices for example). In order to achieve small size and low cost, the power converter functions should be integrated with functional circuitry, and the number and size of external components such as inductors and capacitors should be minimized.

A particular requirement in such applications is for a split rail (bipolar) supply to be generated from a single rail supply. This is easily done with two separate inductors, but to achieve it with one inductor is clearly desirable for reasons of space, cost and pin-out. A DC-DC converter design called a 'buck-flyback' converter has been proposed which can generate split supply from a single supply using a single inductor. However, in the known design, the voltages experienced by one of the switches are higher than those of other devices in the circuit, so that the known design cannot be integrated with the larger signal processing functions without impacting on process selection, circuit reliability and cost.

The invention aims to enable the provision of multi-output DC-DC conversion functions in a manner which can be integrated more readily with general circuit functions.

The invention in a first aspect provides a DC-DC converter circuit having an input terminal for connection to a voltage supply, first and second output terminals and a common terminal, the circuit comprising:

a first capacitor connected between the first output terminal and the common terminal;

a second capacitor connected between the second output terminal and the common terminal;

an inductor;

a switching network comprising a plurality of switches for:
  (a) in a first type of charging cycle (i) connecting the inductor in a first phase between the input terminal and the first output terminal to build current in the inductor and (ii) connecting the inductor in a second phase across the first capacitor to transfer energy from the inductor to the first capacitor and
  (b) in a second type of charging cycle (i) connecting the inductor in a first phase across the first capacitor to build current in the inductor and (ii) connecting the inductor in a second phase across the second capacitor to transfer energy from the inductor to the second capacitor; and a controller for controlling said switching network to implement charging cycles of said first type and second type.

In a preferred embodiment, in the second type of charging cycle, one terminal of the inductor remains connected to the common terminal while the other terminal of the inductor is connected in the first phase to the first output terminal and in the second phase to the second output terminal, whereby the second output voltage has a polarity opposite to that of the first output voltage, relative to the common terminal.

In the preferred embodiment, current in the inductor has opposite polarity in the first and second types of charging cycle.

Said switch network may include four individually controllable switches operable to make the connections required to implement the first and second phases of the first and second types of charging cycle.

Said four switches may comprise: a first switch for connecting the input terminal to the first inductor terminal, a second switch for connecting the first inductor terminal to the common terminal, a third switch for connecting the second inductor terminal to the first output terminal and a fourth switch for connecting the second inductor terminal to the second output terminal.

The controller can be arranged to initiate said cycles in many different ways, some of which will be mentioned here. The controller may in particular include a feedback function arranged to initiate charging cycles of each type with sufficient regularity to maintain voltages across the first and second capacitors within predetermined bounds.

The controller may be arranged to vary the duration of the first phase of each type of cycle in response to varying load conditions while interleaving cycles of both types in sequence, so as to keep each output terminal within a predetermined voltage range in response to varying load conditions.

The controller may be arranged to monitor said load conditions by comparing each output voltage with a reference voltage to obtain a respective error signal, and to vary the duration of the first phase of each cycle in accordance with the magnitude of the corresponding error signal in order to establish feedback control. This results in a smoother output than the alternative in which all cycles deliver an equal charge, but less frequently at times of low demand.

Said error signal may be subject to low-pass filtering to define a desired frequency response of said feedback control.

The controller may be arranged to monitor instantaneous current in the inductor during the first phase of each cycle type and to vary the duration of said first phase by varying a current level at which transition to the second phase will be triggered.

The controller may be arranged to initiate said charging cycles at regular intervals in accordance with a clock signal.

The controller may be arranged to omit completely at least one of said types of cycle in the event that demand from the respective output terminal is not indicated at the start of a corresponding clock period.

The controller may be arranged to put the switch network into a waiting state in the event that current in the inductor returns to zero at the end of the second phase of charging cycle, and to await a transition in said clock signal before initiating a new charging cycle, neither of the inductor terminals being connected to either the first or second output terminal in said waiting state. The switch network in said waiting state may connect together two terminals of the inductor, to suppress residual oscillations.

The controller may be arranged to initiate a charging cycle of said second type immediately current in the inductor returns to zero at the end of the second phase of a charging cycle of the first type, without waiting for a clock signal.

The controller may be arranged to permit successive cycles of the same type to be initiated at times of high demand.

The controller may be arranged to wait for the current in the inductor to return to zero in the second phase of one cycle before initiating a charging cycle of the opposite type.

The controller may be arranged to permit a new charging cycle to be initiated before current in the inductor has returned to zero in the second phase of a previous cycle, provided that both cycles are of the same type.

Applications of the DC-DC converter are varied. The invention for example also provides audio apparatus including a DC-DC converter circuit according to the invention set forth above and audio output circuitry connected to be powered by the first and second output voltages of said converter.

The audio apparatus may be portable.

The audio apparatus may be an in-car audio apparatus, a headphone or a stereo headphone apparatus or a communications apparatus such as a mobile phone or PDA.

The audio apparatus may further include an audio output transducer, such as a speaker, connected as a load connected to an output terminal of output amplifier apparatus connected to be powered by said DC-DC converter. Generation of bipolar supply voltages allows connection of such a load without the bulk and cost of DC blocking capacitors.

The invention further provides a method of converting electrical power from an input voltage supply to first and second output voltages of opposite polarities with respect to a common terminal, the method implementing a first type of charging cycle in which the first output voltage is obtained from the input voltage supply through an inductor and a second type of charging cycle in which the second output voltage is obtained from the first output voltage via the intermediate step of storing energy in the same inductor as is used in the first type of charging cycle.

The method may employ:
- a first output capacitor for maintaining said first output voltage across a first output terminal and said common terminal;
- a second output capacitor for maintaining said second output voltage across a second output terminal and said common terminal;
- a plurality of switches operable to interconnect said terminals and the inductor in a number of predetermined configurations.

The switches may be operated so as to implement charging cycles of the first type and the second type so as to maintain said first and second output voltages respectively within predetermined bounds.

The first type of charging cycle may have a first phase in which energy is transferred from the input supply to the inductor and a second phase in which energy stored in the inductor is transferred to the first output capacitor, the second type of charging cycle having a first phase in which energy is transferred from the first output capacitor to the inductor and a second phase in which energy stored in the inductor is transferred to the second output capacitor.

Four individually controllable switches may be operated to make the connections required to implement the first and second phases of the first and second types of charging cycle.

Said four switches may comprise: a first switch for connecting the input terminal to the first inductor terminal, a second switch for connecting the first inductor terminal to the common terminal, a third switch for connecting the second inductor terminal to the first output terminal and a fourth switch for connecting the second inductor terminal to the second output terminal.

In the second type of charging cycle, one terminal of the inductor may remain connected to the common terminal while the other terminal of the inductor is connected in the first phase to the first output terminal and in the second phase to the second output terminal.

In the preferred embodiments, current in the inductor has opposite polarity in the first and second types of charging cycle.

In preferred embodiments, the duration of the first phase of each type of cycle is varied in response to varying load conditions while interleaving cycles of both types in sequence so as to keep each output terminal within a predetermined voltage range in response to varying load conditions.

Monitoring of said load conditions may be by comparing each output voltage with a reference voltage to obtain a respective error signal, and the duration of the first phase of each cycle is varied in accordance with the magnitude of the corresponding error signal in order to establish feedback control. Said error signal may be subject to low-pass filtering to define a desired frequency response of said feedback control.

Many different control strategies are possible within the basic parameters set out above. Some examples will be mentioned here. The instantaneous current in the inductor may be monitored during the first phase of each cycle type while the duration of said first phase is varied by varying a current level at which transition to the second phase is triggered.

Said charging cycles may be initiated at regular intervals in accordance with a clock signal.

In one embodiment, at least one of said types of cycle is omitted completely in the event that demand from the respective output terminal is not indicated at the start of a corresponding clock period.

In one embodiment, the switches are put into a waiting state in the event that current in the inductor returns to zero at the end of the second phase of charging cycle, and a transition in said clock signal is awaited before initiating a new charging cycle, neither of the inductor terminals being connected to either the first or second output terminal in said waiting state.

The switches in said waiting state may connect together two terminals of the inductor.

In another embodiment a charging cycle of said second type is initiated immediately current in the inductor returns to zero at the end of the second phase of a charging cycle of the first type, without waiting for a clock signal.

Successive cycles of the same type may be initiated at times of high demand without intervening cycles of the other type.

Current in the inductor may be monitored for a return to zero in the second phase of one cycle before a charging cycle of the opposite type is initiated.

A new charging cycle may be initiated before current in the inductor has returned to zero in the second phase of a previous cycle, both cycles being of the same type.

The invention in a related aspect provides an integrated circuit for use in DC-DC converter circuit having input terminals for connection to a voltage supply, first and second output terminals and a common terminal, and first and second inductor terminals for connection to an off-chip inductor, the integrated circuit comprising a network of switches operable in a plurality of states including:
- a first state in which the first and second inductor terminals are connected to the input terminal and the first output terminal respectively;

a second state in which the first inductor terminal is connected to the common terminal and the second inductor terminal is connected to the first output terminal;

a third state in which the first inductor terminal is connected to the common terminal and second inductor terminal is connected to the second output terminal.

This integrated circuit can be made in a compact and low cost form, and used with other components to implement the converter circuit and methods set for the above.

The integrated circuit may further comprise a controller arranged to receive feedback signals derived from said output terminals and in response to said feedback signals to initiate at least two different types of charging cycle, each type of cycle comprising a plurality of phases, each phase having the switch network controlled into a specific one of said states, whereby the first and second output terminals in operation will be maintained at or around respective target voltages, the voltages on the first and second output terminals having opposite polarities relative to the common terminal.

Said controller may be arranged to charging cycles include (a) a first type of charging cycle in which the switch network is placed firstly in said first state so as to build current in the inductor and subsequently placed in said second state so as to transfer energy from the inductor to a capacitor connected across said first output terminal and said common terminal and (b) a second type of charging cycle in which the switch network is placed firstly in said second state so as to build current in the inductor by drawing energy from said first capacitor and subsequently placed in said third state thereby to transfer energy from the first capacitor to a second capacitor, connected between the second outputterminal and ground.

Said switch network may include four individually controllable switches which are sufficient to make the connections specified to define said first, second and third states.

Said four switches may comprise: a first switch for connecting the input terminal to the first inductor terminal, a second switch for connecting the first inductor terminal to the common terminal, a third switch for connecting the second inductor terminal to the first output terminal and a fourth switch for connecting the second inductor terminal to the second output terminal.

Said switch network may be further operable in a fourth state in which neither of the inductor terminals is connected to the first or second output terminal. In said fourth state the first inductor terminal may be connected to the common terminal. Alternatively, in said fourth state the first inductor terminal may be connected to the second inductor terminal.

The switch network may include an additional switch for making the connection between said inductor terminals in said fourth state, which switch is open in said first, second and third states. Said additional switch may be of smaller physical area than switches of the network which are involved in making the connections specified for the first, second and third states.

The integrated circuit may further include functional circuitry connected to be powered by said DC-DC converter.

Said functional circuitry may include an audio amplifier, or communication circuitry such as a line driver or antenna driver.

The invention in another aspect provides a DC-DC converter circuit having a first input terminal and a common terminal for connection to a voltage supply and first and second output terminals, the circuit comprising:
a first output capacitor connected across the first output terminal and the common terminal for maintaining a first output voltage across a first load;
a second output capacitor connected across the second output terminal and the common terminal for maintaining a second output voltage across a second load;
an inductor;
a switching network comprising a plurality of switches operable in sequence for first and second charging cycles; and
a controller for initiating the first and second charging cycles so as to maintain said first and second output voltages within predetermined bounds,
wherein in operation said first charging cycle connects the inductor
  (i) in a first phase between said first input terminal and said first output terminal so as to store energy in the inductor and then
  (ii) in a second phase across the first output capacitor so as to transfer energy from the inductor to said first capacitor,
while said second charging cycle connects the inductor
  (iii) in a first phase across the first output capacitor so as to transfer energy from the first capacitor to the inductor and
  (iv) in a second phase across the second output capacitor so as to transfer energy from the inductor to the second output capacitor.

The invention further provides a buck converter for converting an input voltage to first and second output voltages, said first and second output voltages having opposite polarities, said converter comprising:
an inductor;
a first output capacitor for maintaining said first output voltage across a first load;
a second output capacitor for maintaining said second output voltage across a second load;
a switching network comprising a plurality of switches; and
a controller for initiating first and second charging cycles so as to maintain said first and second output voltages within predetermined bounds
wherein said plurality of switches are operable in a sequence of phases for
  (i) transferring energy from said input voltage to said inductor; then
  (ii) transferring energy from said inductor to said first output capacitor; then
  (iii) transferring energy from said first output capacitor to said inductor; and then
  (iv) transferring energy from said inductor to said second capacitor;

The buck converter may be arranged to operate such that the current flowing in said inductor reverses direction between transferring energy from said inductor to said first output capacitor in phase (ii) and transferring energy from said first output capacitor to said inductor in phase (iii).

The invention in yet another aspect provides a dual-output voltage DC-DC converter comprising: a first output that selectively obtains a first voltage from a voltage source through an inductor; and a second output that selectively obtains a second voltage from the first voltage by storage of energy in the same inductor as an intermediate step, wherein said first and second voltages are opposite polarities These and other features and advantages of the invention in its various embodiments will be understood from a consideration of the detailed description which follows.

BRIEF DESCRIPTION OF THE DRAWINGS

Embodiments of the invention will now be described, by way of example only, by reference to the accompanying drawings, in which:

FIGS. 7a and 7b show in more detail a control circuit suitable for use in the converter of FIG. 4;

FIG. 8 is a state transition diagram implemented by the control circuit of FIG. 7a;

DETAILED DESCRIPTION OF THE PREFERRED EMBODIMENTS

Background—DC-DC Converter Applications

Figure 1A:
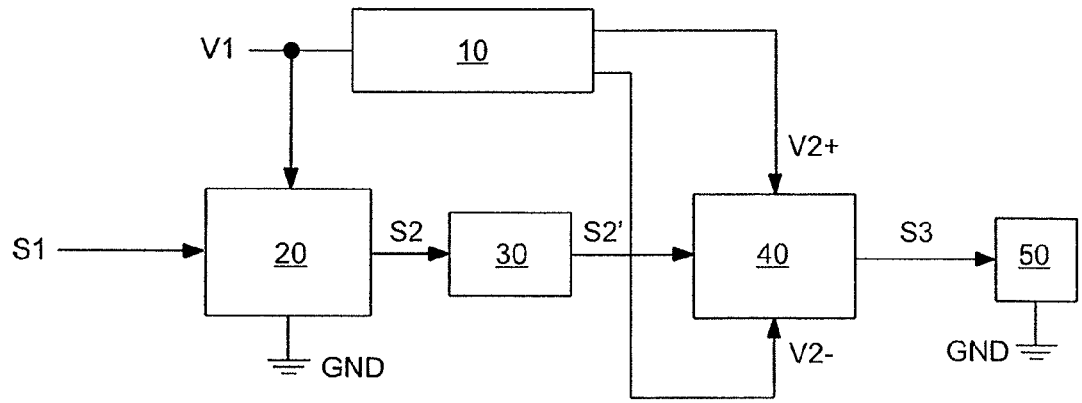
FIGS. 1a and 1b show in block schematic form two amplifier circuits in which the DC-DC converters embodying the present invention may be used.

FIG. 1a represents a typical application wherein dual rail supply voltages V2+ and V2− are generated by a DC-DC converter 10, the converter 10 being supplied from a single rail supply voltage V1. Labels V1, V2+ etc. are be used in this description to refer to either the respective terminals or the voltage at that terminal, according to context.

The supply voltage V1 is illustrated as supplying processing circuitry 20. The input signal S1 maybe an analogue signal or a digital signal. In the case where S1 is an analogue signal then the processing circuitry 20 will be purely analogue type circuitry such as op-amps, multiplexers, gain blocks etc. In the case where S1 is a digital signal and the output stage is analogue, then the processing circuitry 20 may be a mixture of digital and analogue circuitry where signal S1 is fed, either directly or through some digital signal processing, into a DAC (not illustrated) and the output of the DAC is then fed into the analogue circuitry as mentioned above.

The processing circuitry 20 outputs a processed signal S2 that in this particular embodiment is passed into a level shifter 30 that may be implemented by a DC-blocking capacitor for example. An output amplifier 40 is powered by the dual rail supply voltages V2+ and V2− generated by the DC-DC converter 10. The input signal S1, if analogue, and analogue signals in the processing circuitry 20 will normally be referenced midway between ground potential and V1, whereas the level shifted signal S2' is referenced to ground, as required by the output amplifier operating from the split rail supply V2+, V2−.

The level shifted signal S2' is fed into the output amplifier 40 which outputs an amplified output signal S3 which is fed into a ground referenced load in the form of signal transducer 50. In the case where the output amplifier 40 is a switching (class D or PWM) amplifier, or a 1-bit digital (sigma-delta) type output stage, the signals S1, S2 may be digital in form right through to input to output, or may begin in analogue form and be converted to digital form in the processing circuit 20.

Figure 1B:
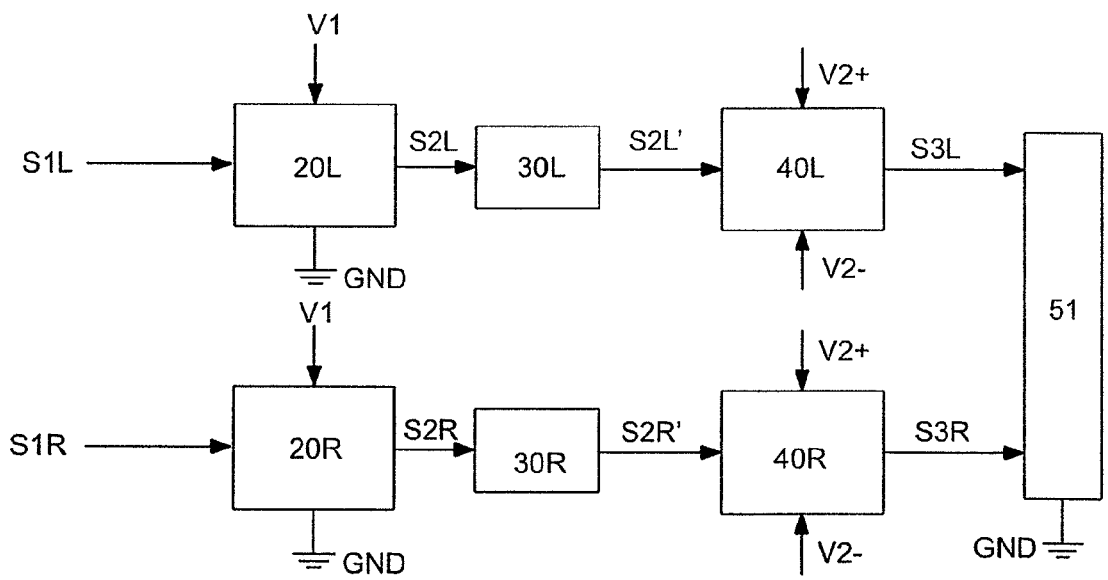

FIG. 1b illustrates a more specific application of the arrangement of FIG. 1a; the DC-DC converter 10 and supply connections have been omitted for clarity. The application in this example is a stereo amplifier in which the load is a stereo headphone 51. The signal processing elements of the amplifier are duplicated to process left and right channel signal, as indicated by the suffixes 'L' and 'R' on their reference signs. The supplies can be shared by both channels, although independent supplies for different channels would be possible if the application demands it. One area of application is in portable audio apparatus such as MP3 players for example where the split rail supply allows a DC-coupled output, which is desirable to maintain the bass response without having to use large decoupling capacitors.

Other possible application areas where the ability to generate a split rail supplies include (1) voltage supplies for circuits handling analogue composite video signals, where a ground-referenced DC-coupled output signal can avoid black-level droop; and (2) line drivers for data links or modems such as ADSL where a ground-referenced dc coupled output signal can reduce baseline wander effects.

For cost and size reasons, it is important to be able to integrate the functions of an MP3 player, mobile phone or any other application into a small number of integrated circuits. Therefore it is advantageous to integrate the circuitry for supply voltage generation, in this case the DC-DC converter 10, together with the functional circuitry 20, 30, 40 etc. Generally speaking, the converter 10 includes an inductor which cannot realistically be integrated and has to be located off-chip, with consequences for chip-pin-count and overall circuit size. Since many circuits require supplies of dual polarity (split rail supplies), this has prompted the development of voltage generation circuits that are capable of generating two (or more) output voltage supplies using a single inductor, rather than an inductor per required output voltage.

Background—DC-DC Converter Circuits

Figure 2:
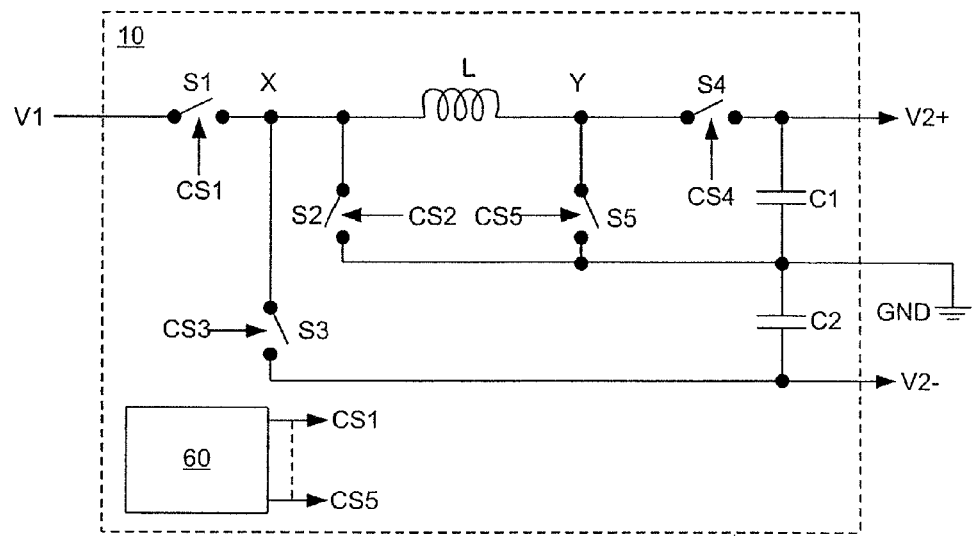
FIG. 2 shows a known buck-flyback type of DC-DC converter circuit comprising an inductor, two capacitors and a number of switches.

FIG. 2 shows the structure of a known DC-DC converter circuit, capable of receiving a voltage supply at voltage V1 (relative to ground) and generating positive and negative supplies V2+ and V2− using a single inductor. DC-DC converter topologies are generally classified into types such as 'buck', 'boost', 'buck-boost' and so forth; the circuit shown in FIG. 2 has been referred to in the literature as one form of 'buck-flyback' converter.

The circuit comprises a network of five switches S1 to S5 connecting the input and output terminals V1, V2+, V2− and a common ground GND. The circuit includes just one inductor L, with nodes labelled X and Y at either end. As mentioned above, the inductor will be located off-chip, in which case nodes X and Y correspond to pins of the integrated circuit on which the DC-DC converter is made. Each output has a reservoir capacitor, C1 for the positive or 'high side' output terminal V2+, and C2 for the negative or low side output terminal V2−. The capacitors are generally off-chip too, the outputs V2+, V2− and GND also corresponding to external pins of the chip.

Switch S1 when closed connects input terminal V1 to node X. Similarly: switch S2 connects node X to ground; switch S3 connects node X to low side output terminal V2−; switch S4 connects node Y to high side output terminal V2+; and switch S5 connects node Y to ground. Each switch S1 to S5 is controlled by a respective switch control signal CS1-CS5 and these control signals are generated by a controller 60 which activates the switches in predetermined sequences in response to sensing signals together with common signals such as a clock, start-up and shut-down. In an integrated circuit embodiment (or indeed for discrete embodiments) the switches S1 to S5 will generally be implemented using MOS transistors. Current-sensing features may be associated with some or all of the switches to provide feedback to the controller. These are all omitted from the drawing for clarity.

The operation of the known Buck-Flyback DC-DC converter 10 of FIG. 2 will now be described with reference to FIGS. 3a to 3f which show the states of the switches in six key phases of operation. The controller cycles the circuit through these phases at a frequency far higher than the audio frequency, so that variations in the output supply voltages are minimised and noise is outside the band of interest in the audio or other application. More detail of the form and operation of the controller will be given in relation to the novel circuit of FIG. 4.

A complete cycle of operation of the converter includes a first type of sub-cycle in which the inductor L supplies current to generate the positive output voltage V2+ and a second type of sub-cycle in which it is used to supply current to generate the negative output voltage V2−. The voltages V2+ and V2− in this example are nominally equal in magnitude and less than V1. In between these sub-cycles the inductor current returns to zero, as in the "discontinuous mode" of operation of a standard buck type converter.

Figure 3A:
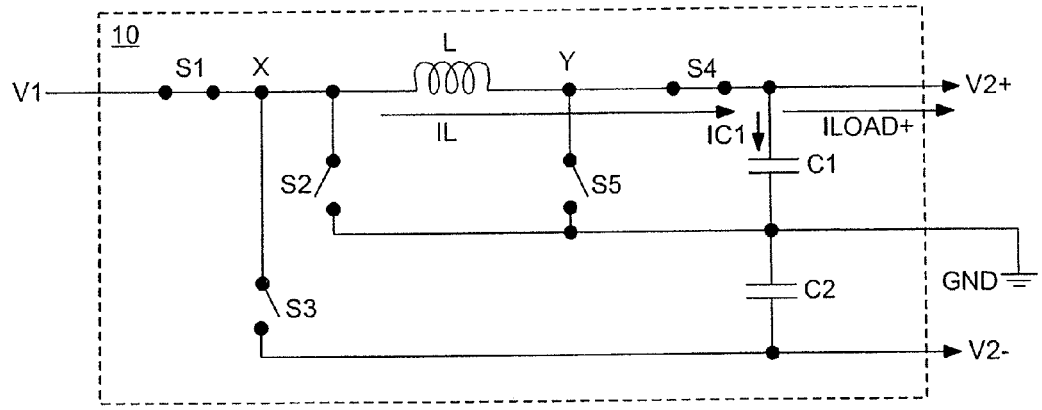
FIGS. 3a-3f illustrate the configuration of the switches in the circuit of FIG. 2 during successive phases in the generation of a bipolar voltage supply.
Figure 3B:
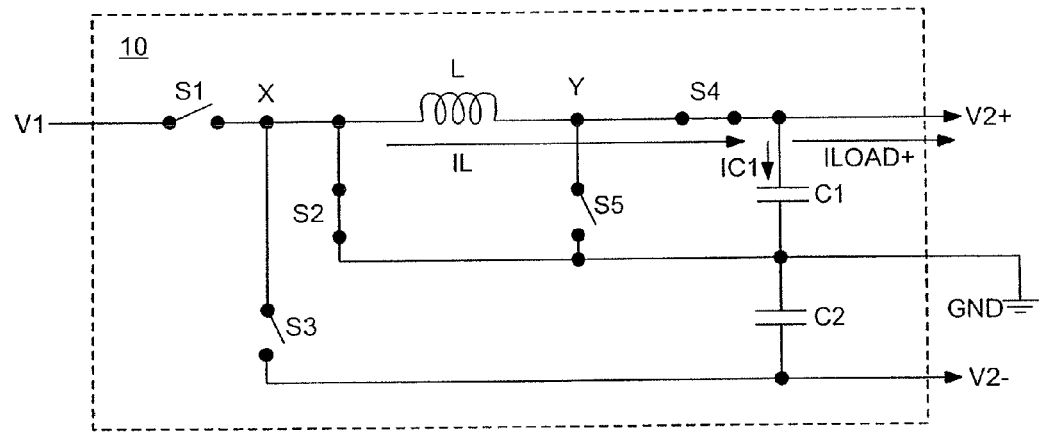
Figure 3C:
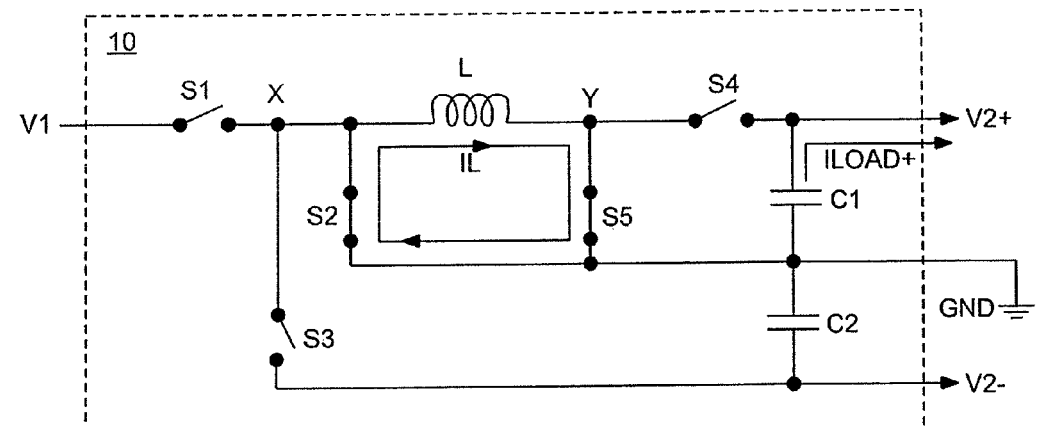

The first type of sub-cycle includes three phases A to C which correspond to the circuit states shown in FIGS. 3a to 3c respectively. It should be noted that, for reasons of clarity, the controller 60, all sensing signals and control signals CS1 to CS5 illustrated in FIG. 2 have purposely been omitted from FIGS. 3a to 3f.

Phase A—(FIG. 3a): In the first phase switches S1 and S4 are closed. Initially the inductor current is zero. The inductor L has V1−(V2+) applied across it so that a current IL through the inductor L builds up and starts to charge up the reservoir capacitor C1 (IC1) despite the demand for load current (ILOAD+) demand simultaneously pulling charge out of capacitor C1 and into the high side load (not illustrated) and through the load to ground.

Phase B (FIG. 3b): In the next phase, S1 is opened and S2 closed, while S4 remains closed. Current IL in the inductor L continues flowing (this is the defining characteristic of an inductor), continuing to charge up capacitor C1, as well as supplying load current ILOAD+. However, inductor L now has a voltage of V2+ applied across it which is the opposite polarity to that in Phase A. Thus current IL ramps down, eventually to zero.

Phase C (FIG. 3c): In order to avoid pulling charge back out of capacitor C1 and so reducing efficiency, switch S4 is opened when the inductor current IL reaches zero. Switch S2 remains closed. Furthermore, it is preferable to short the nodes X and Y of the inductor L somehow at this point, in order to avoid voltage oscillations due to any residual current in the inductor. This can be done conveniently by closing switch S5 as shown.

With the first sub-cycle finished and the inductor current returned to zero, there can now follow the second type of sub-cycle in which inductor L is used to charge the negative rail capacitor C2.

Figure 3D:
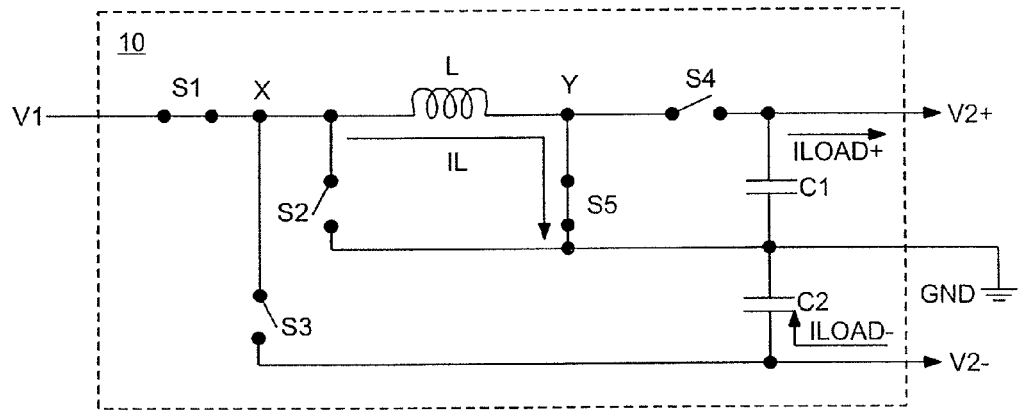
Figure 3E:
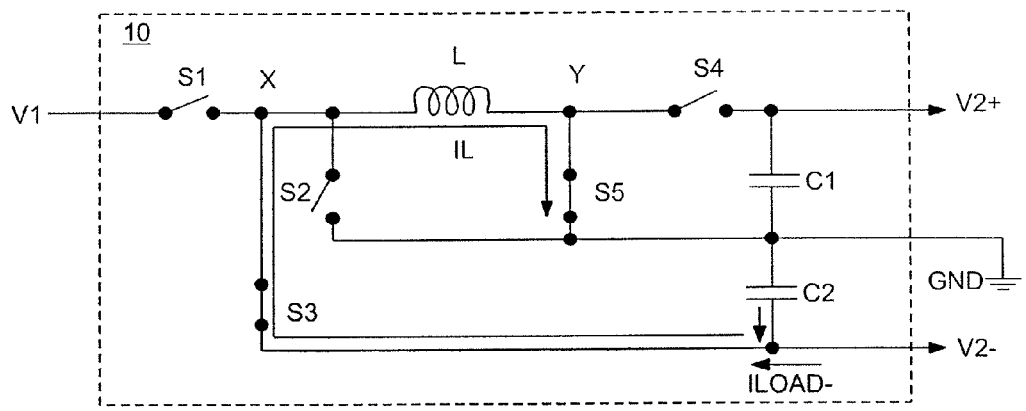
Figure 3F:
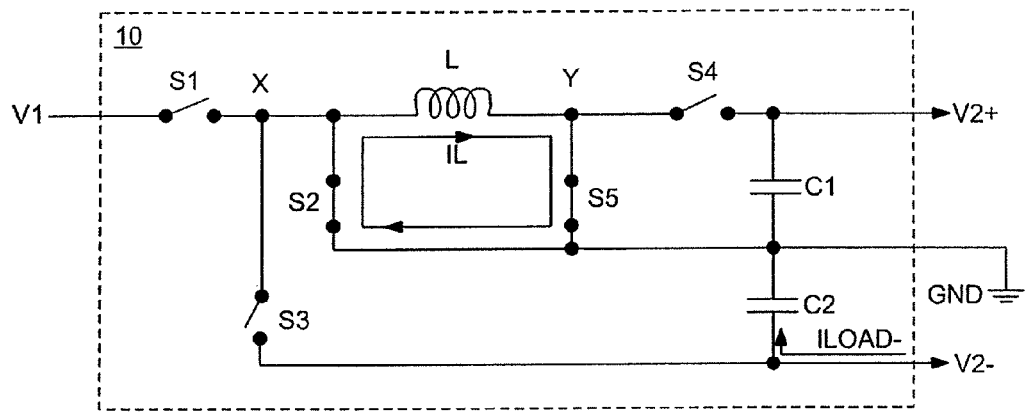

The second type of sub-cycle comprises three phases D, E and F. The states of switches S1 to S5 and the resulting current flow to generate the negative voltage V2− in these three phases are shown in FIGS. 3d to 3f respectively. Again, for reasons of clarity, controller 60, various sensing signals and control signals CS1 to CS5 are omitted from FIGS. 3d to 3f.

Phase D (FIG. 3d): Switches S1 and S5 are closed. Initially the inductor current is zero, but, now that the inductor L has V1 applied across it, current IL builds up, just as it did in Phase A of the first type of sub-cycle (FIG. 3a). Meanwhile the low side load (not shown) draws current ILOAD− to ground, and so simultaneously pulls charge out of the reservoir capacitor C2.

Phase E (FIG. 3e): After a time, switch S1 is opened and switch S3 closed. Switch S5 remains closed. Inductor current IL continues flowing, charging up the reservoir capacitor C2, as well as supplying the low side load current ILOAD−. The inductor L has a voltage V2− applied across it, in opposite polarity to the previous phase, and so current IL will ramp down eventually to zero.

Phase F (FIG. 3f): When inductor current IL reaches zero, switch S3 is opened in order to avoid pulling charge back out of the capacitor C2, which would reduce efficiency. Switch S5 remains closed. Furthermore, in order to avoid voltage oscillations due to any residual current IL in the inductor L, switch S2 is preferably closed as shown, so as to short the terminals of the inductor L.

By cycling through these six phases A to F, as illustrated in FIGS. 3a to 3f, capacitors C1 and C2 can be recharged alternately, thus generating dual rail, positive and negative, voltages using a single inductor.

Generally the output voltages from V2+/V2− will be fed back and compared to respective target voltages. The resulting error signals are used to derive the appropriate duty-cycles, that is the on times, of the two charging phases to provide the current required to minimise these errors. Detail of this control function in the known circuit is not material to the present description. More detail will be provided in relation to control of the novel DC-DC converter circuits described below.

Now, as mentioned above, the switches S1 to S5 will be realised in the form of MOS transistors. On an integrated circuit in particular, these transistors will have maximum voltage rating both for long term reliability and to prevent immediate damage. A standard mixed-signal pross with 0.18 um minimum feature size may for example have two types of MOS transistors that are rated at 1.8 volts and 5 volts respectively, typical of operating voltage. Allowing 10% tolerance for variations in supply voltage, this would allow for circuitry to operate reliably from a 5.5 v supply voltage.

In such circumstances, it can be difficult, or at any rate costly, to integrate the circuit of FIG. 2, because of the peak voltage stress across switch S3. Specifically, in Phase D of operation of the known circuit (FIG. 3d), one side of switch S3 is connected (directly) to the negative output V2− while the other side of S3 is connected to node X which, in Phase D, is at the input supply voltage V1. Also, in Phase E (FIG. 3e), one side of switch S1 is connected to V1, whereas the other side of S1 is connected to node X which in Phase E is at the low-side output voltage.

The peak voltage stress across S3 or S1 is given by:

$$V1-(V2-)$$

Assume that the semiconductor process is a standard mixed signal process for example: 0.18 um with 1.8V and 5V transistors and that V1=5.5V and V2=−1.5V. Therefore, the peak stress across S3 or S1 will be:

$$5.5V-(-1.5V)=7$$

For the example process, a peak stress voltage of 7V is significantly above the 5.5 v maximum dictated by long term reliability constraints, and indeed uncomfortably close to the minimum potential level of 8 v for the breakdown voltage (BVdSS) of the transistors. Immediate transistor breakdown may well be possible when factoring in transient overshoots which will occur when switching the inductor L, or at best the transistor may wear out prematurely due to this extra repetitive stress due to these overshoots. Any such transistor breakdown will normally lead to immediate destruction of the transistors and hence circuit and system failure, which is clearly undesirable.

Semiconductor processes do exist that include additional processing steps that allow the fabrication of transistor structures that are capable of supporting higher breakdown voltages. However, such processes, because of the extra processing steps, are inherently more expensive per wafer. Also, such processes are less widely available than, for example, the above disclosed 1.8V/5V mixed signal process and similar such processes. The electrical characteristics and layout rules of the higher voltage transistors are less standard making it hard to transport circuit designs from one silicon foundry to another. Furthermore, the physical size of the transistors increases with an increase in the breakdown voltages, thus adding to the die area, reducing dice per wafer, increasing packaging requirements and so forth.

Novel DC-DC Converter

Figure 4:
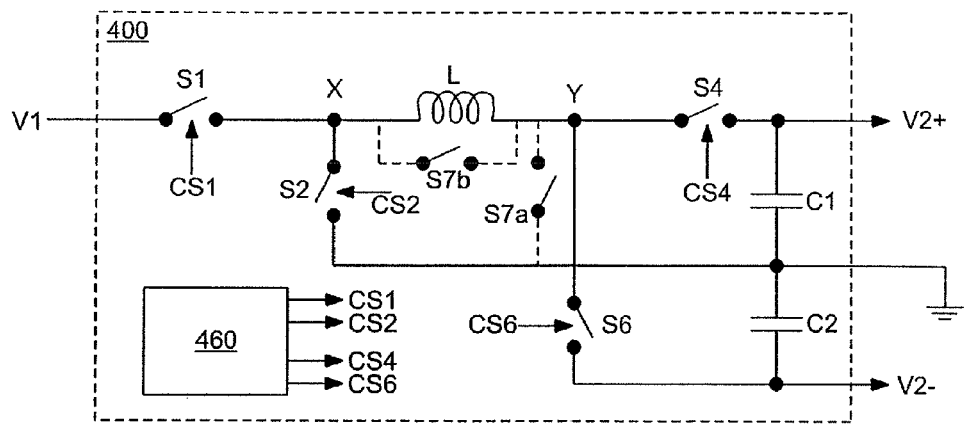
FIG. 4 shows a novel DC-DC converter circuit according to a first embodiment of the invention.

FIG. 4 shows the structure of a novel DC-DC converter circuit 400 for generating bipolar supplies using a single inductor by a topology and phase sequence that overcomes the problem associated with the known buck-flyback converter, namely the stressing of one or more switches.

In the FIG. 4 circuit and this description thereof, similar conventions are used as in the description of the known circuit (FIGS. 2 and 3a-3f) above, and like reference signs are used for ease of reference. As in the known circuit, we see input and output terminals V1, V2+ and V2– and a ground terminal (GND), an (off-chip) inductor L coupled to nodes X and Y and capacitors C1 and C2 storing charge for the high side and low side outputs respectively.

The switch network in the novel circuit 400 has four main switches instead of the five of the known circuit. These are labelled S1, S2, S4 and S6, to avoid confusion with switches playing different roles in the known circuits. The network is connected as follows: switch S1 when closed connects input terminal V1 to node X; switch S2 connects node X to ground; switch S4 connects node Y to high side output terminal V2+; and switch S6 connects node Y to the low side output terminal V2–. An additional switch may optionally be provided, at either position S7a or S7b, as shown dotted in FIG. 4. Each switch is controlled by a respective switch control signal CS1, CS2, CS4, CS6, CS7 and these control signals are generated by a controller 460 which activates the switches in predetermined sequences in response to sensing signals together with common signals such as a clock, start-up and shut-down. Controller 460 is naturally a modified version of controller 60 in the known circuit, and will be described in more detail after the basic operating sequence of the novel circuit has been described with reference to FIGS. 5a to 5f.

In an integrated circuit embodiment (or indeed for discrete embodiments) the switches S1 etc. may again be implemented using MOS transistors. Current-sensing features are associated with some or all of the switches to provide feedback to the controller. These are all omitted from the drawing for clarity.

With reference to FIGS. 5a to 5f and FIG. 6, operation of this DC-DC converter 400 again occurs in two types of sub-cycles, comprising phases A-B-C and D-E-F respectively. As before, the first sub-cycle A-B-C uses inductor L to supply current IL to charge high side output capacitor C1 to generate a positive output voltage V2+ (less than V1). In contrast, however, the second sub-cycle D-E-F uses inductor L to take charge not from input V1 but from high side capacitor C1, transferring it from there to capacitor C2 to generate a negative output voltage V2–.

Figure 5A:
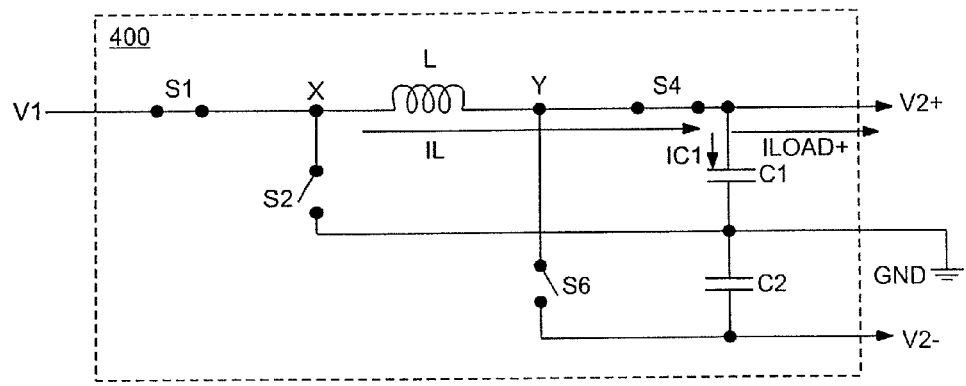
FIGS. 5a to 5f illustrate the configuration of the switches in the circuit of FIG. 4 during successive phases A-F in the generation of a bipolar voltage supply.
Figure 5B:
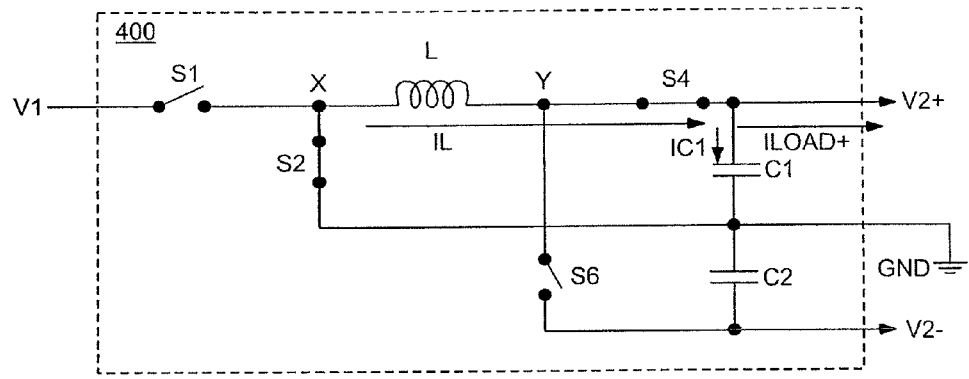
Figure 5C:
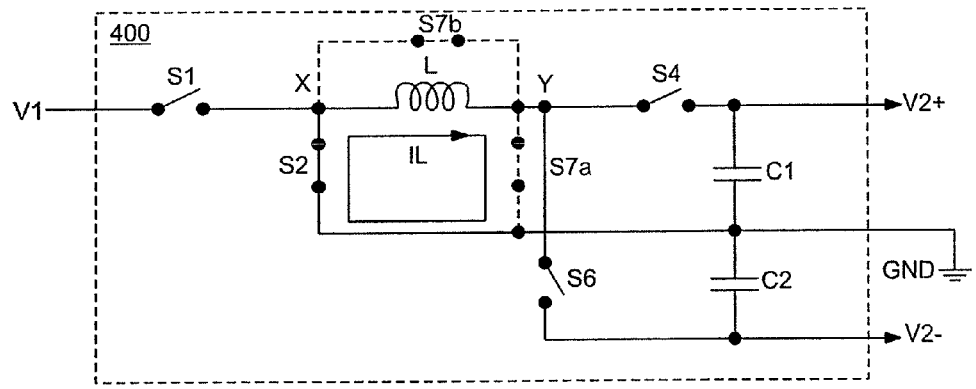
Figure 5D:
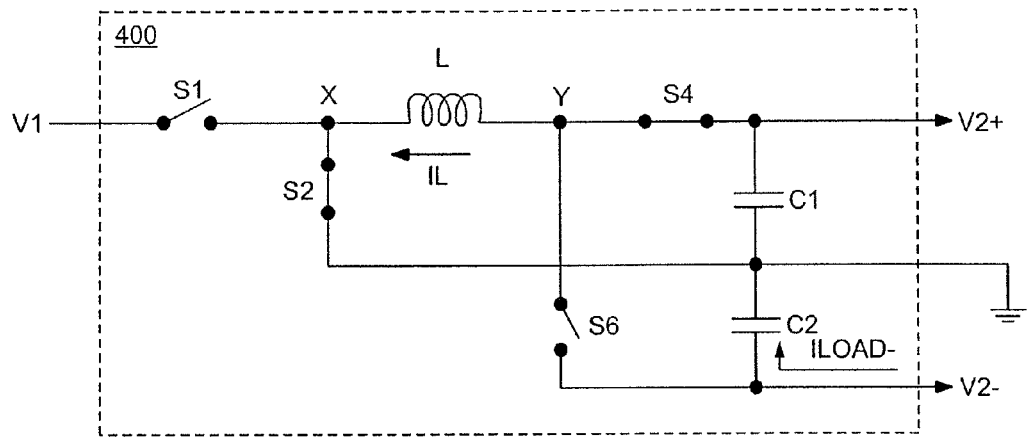
Figure 5E:
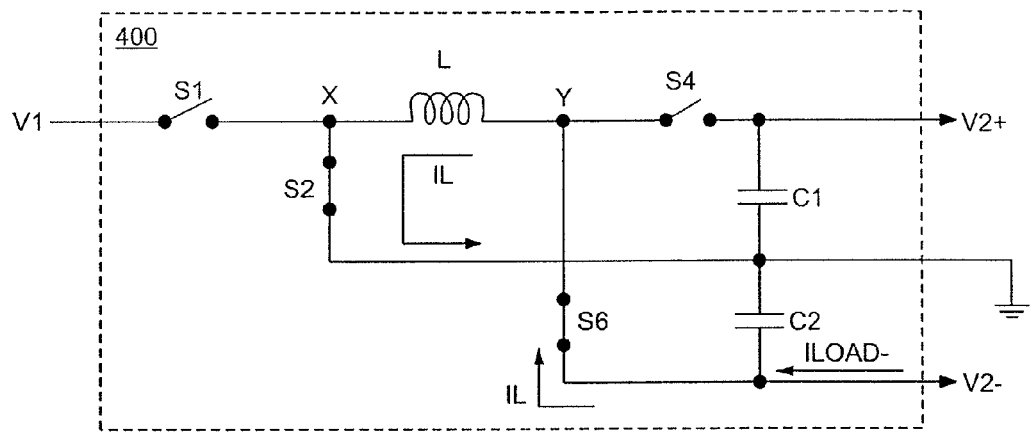
Figure 5F:
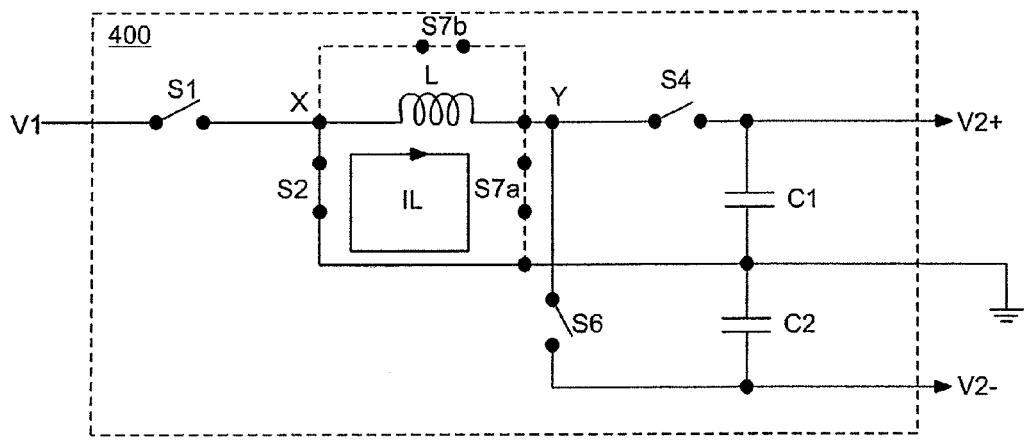
Figure 6:
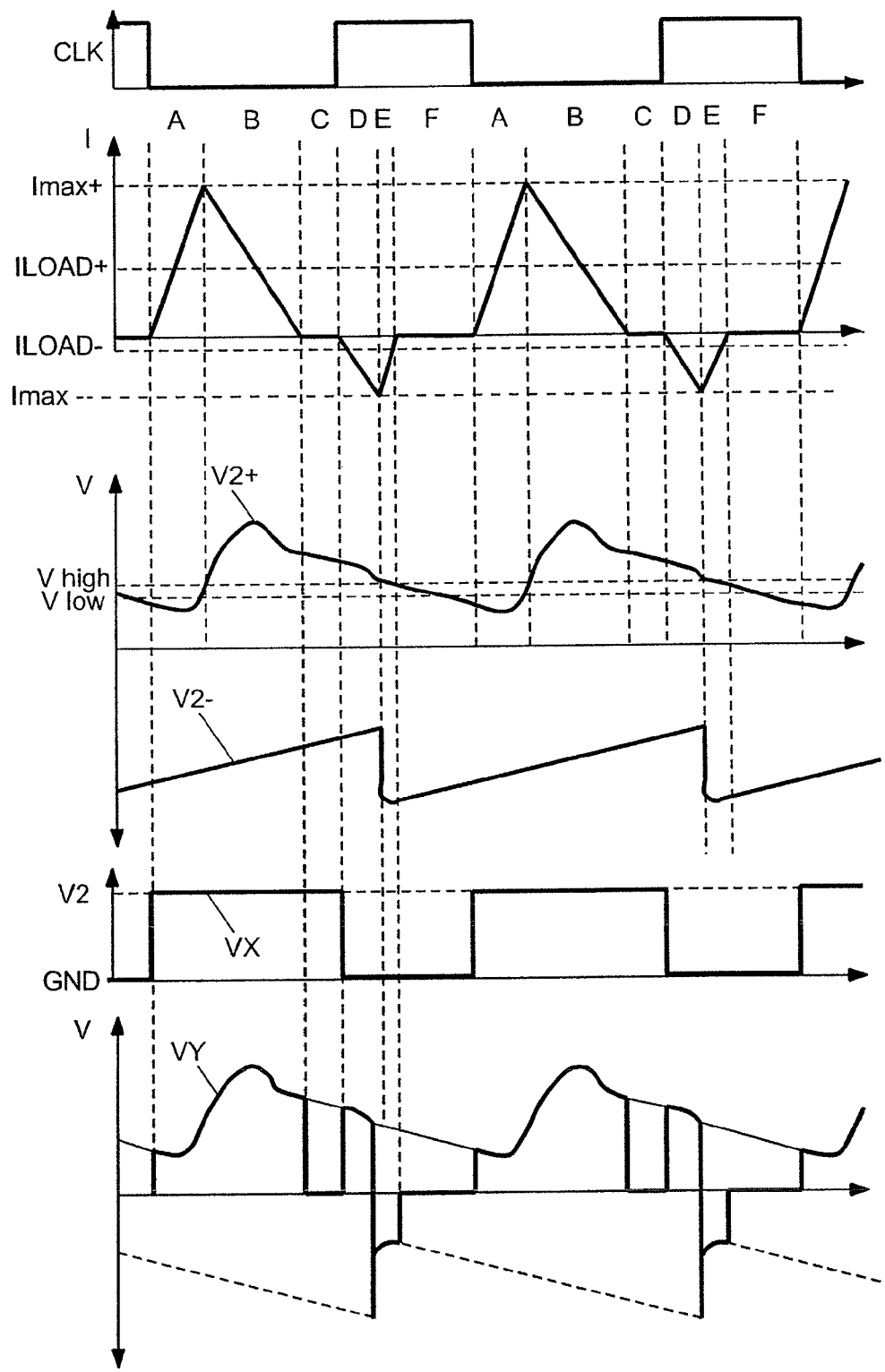
FIG. 6 shows waveforms present in the circuit of FIG. 4 in operation.

FIG. 6 shows operational waveforms associated with the phases A to F (FIGS. 5a to 5f respectively) in the novel converter. The skilled reader will appreciate that the waveforms shown in these diagrams are illustrative only and not intended to show the scale of variations or their detailed form. The cyclic variations shown in the output voltages V2+ and V2– in particular are greatly exaggerated here, for the sake of explanation, compared with what would be expected in a high quality audio application, for example.

In more detail, the first type of sub-cycle includes three phases A to C which correspond to the circuit states shown in FIGS. 5a to 5c respectively. It should be noted that, for reasons of clarity, the controller 460, all sensing signals and control signals CS1 to CS7 illustrated in FIG. 4 have purposely been omitted from FIGS. 5a to 5f. It should be further noted that the "Phases" referred to in FIGS. 5a-5f corresponds to the Phases A-F respectively of the respective waveforms illustrated in FIG. 6 and described in more detail below.

Phase A (FIG. 5a): In the first phase of operation, switches S1 and S4 are closed as shown in FIG. 5A. Inductor current IL is initially zero but now the inductor L has V1–(V2+) applied across it so current IL builds up, and increases charge on the high side reservoir capacitor C1, despite the high side load (not illustrated) simultaneously drawing current ILOAD+ out of this capacitor C1 and sinking it to ground GND.

Phase B (FIG. 5b): After a time, when the inductor current IL has reached the level Imax+ shown in FIG. 6, switch S1 is opened and switch S2 closed while switch S4 remains closed. The current IL in the inductor L continues flowing, charging up the reservoir capacitor C1, as well as supplying the high side current ILOAD+. As the inductor L has now has a voltage V2+applied across it, in opposite polarity to the previous phase, current IL will ramp down, eventually to zero.

Phase C (FIG. 5c): When the inductor current IL reaches zero, switch S4 is opened to avoid pulling charge back out of the capacitor C1, which would impair efficiency. Furthermore, in order to avoid voltage oscillations due to any residual current in the inductor L, the additional switch S7a is turned on in series with switch S2 to short the inductor L. Alternatively, a switch S7b may be used to short the inductor terminals X and Y directly.

With the inductor current returned to zero, the controller can bring the circuit into the second sub-cycle which comprises three phases D, E and F. The states of switches S1 to S5 and the resulting current flow to generate the negative voltage V2– in these three phases are shown in FIGS. 5d to 5f respectively. While the operation of the circuit in the first sub-cycle three phases has been substantially identical to that of the known converter, the structure and operating sequence of the second sub-cycle are very different. Again, for reasons of clarity, controller 60, various sensing signals and control signals CS1 to C4, CS6, and CS7 are omitted from FIGS. 5d to 5f.

Phase D (FIG. 5d): In the first phase of the second sub-cycle, switches S2 and S4 are closed, while switches S1 and S6 are open. Initially the inductor current IL is zero, but inductor L now has voltage V2+ applied across it so current IL builds up, but in the opposite polarity to the previous sub-cycle. Consequently, rather than drawing the current from the input supply at V1, this current IL is drawn from the high side reservoir capacitor C1. Meanwhile the low side load feeds current ILOAD− into the low side of the reservoir capacitor C2, tending to make V2− less negative (this may be understood more easily as the load drawing a current −ILOAD− from the capacitor V2−).

Phase E (FIG. 5e): After a time, when the inductor current IL has reached its maximum level (Imax− shown in FIG. 6), switch S4 is opened and switch S6 closed, while switch S2 is kept closed. The current IL in the inductor L continues flowing (this is the characteristic behaviour of an inductor) charging up the reservoir capacitor C2, as well as supplying the current ILOAD− to the load. The inductor L now has voltage V2− applied across it, in opposite polarity to the previous phase, so its current will ramp down, eventually to zero.

Phase F (FIG. 5f): When the current reaches zero (Phase F), switch S6 is opened to avoid pulling charge back out of the capacitor C. Where a switch S7a or S7b is provided, this is closed in order to avoid voltage oscillations due to any residual current in the inductor L. Switch S7a would be turned on along with S2 remaining on in series with switch S7a, to short the inductor. The alternative switch S7b can short the inductor by itself. An alternative form of Phase F would have switch S2 opened instead of S6 (with S7b in place if desired to short the inductor).

By cycling repeatedly through these six phases (A-F), the capacitors C1 and C2 can be re-charged in turn alternatively, thus generating positive and negative voltage supplies V2+ and V2− using a single inductor. It should be noted that the current in the inductor reverses between the two types of charging cycle, whereas in known multi-output buck converters the current in the inductor always tends to flow in the same direction.

Importantly, it can now be seen that, in the present example, none of the switches ever sees greater potential more than the voltage at input voltage V1, relative to ground, across its terminals. The voltage at node X switches between V1 and ground, so switches S1 and S2 are never stressed by more than V1. Node Y is switched either to V2+ by S4 or V2− by S6, so neither of these two switches will see a stress greater than V2+−(V2−). In other embodiments where the voltages V2+ and V2− are higher, for example V1=5V and V2+/V2−=+/−3V, this peak switch voltage may be greater than V1, but importantly it will be less than the value V1−(V2−) experienced in the known circuit.

Additionally, since the switch S7a or S7b will only have to pass the residual current in the inductor, not any part of the load current, its 'on resistance' is relatively unimportant which implies that a small MOS switch may be employed. Accordingly, the novel circuit therefore requires only four principal switches, compared with five required in the known buck-flyback circuit of FIG. 2. These principal switches can be distinguished from auxiliary switches such as switch S7a or S7b by their size and performance characteristics, which are critical to the efficiency of the DC-DC converter as a whole.

Controller 460

FIGS. 7a and 7b illustrate in more detail an implementation of controller 460 circuitry that may be used to control the operation of the DC-DC Converter 400 just described with reference to FIGS. 4 to 6. This control circuitry illustrates a simple current-mode control loop for maintaining each of the output voltages V2+ and V2− within a desired range.

Figure 8:
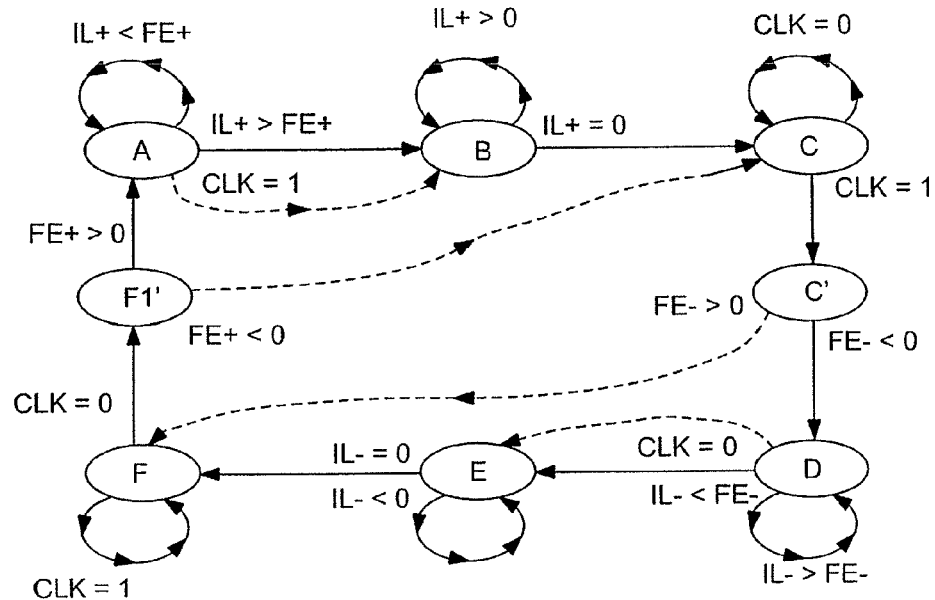

The controller 460 of FIG. 7a comprises switch control logic or sequencer 462 which conveniently implements a finite state machine according to well-known design principles (the corresponding state transition diagram is shown in FIG. 8). Preferably, a square wave clock signal CLK is provided so that the frequency of charging cycles, and hence any resulting artefacts in the output voltages, are well-defined. Sequencer 462 has inputs connected to sensing and pre-processing circuitry to be described, and has outputs carrying the switch control signals CS1, CS2, CS4, CS6 and CS7. Switch pre-drive and level shifting circuitry 464 applies these control signals in the appropriate form to the array 465 of switches S1, S2, S4, S6 and S7a/S7b seen in FIG. 4, which in FIG. 7a is simply is depicted as a block at the right hand side of the drawing. The external inductor L and capacitors C1, C2 can be seen, as can the input and output terminals GND, V1, V2+ and V2−.

A potential divider comprising resistors R1a and R1b is connected across the high side output terminals to produce at terminal V3+ a scaled down version of the high side output voltage. A high side voltage sensing path comprising a first differential input amplifier (for example a transconductance stage) 466, a high side error filter 468 (typically an RC network) and a first comparator 470 processes the voltage V3+ to feed a logic signal CD+ to the sequencer 462. Input amplifier 466 has a reference input connected to the source of a reference voltage Vref. First comparator 470 has its reference input connected to receive a representation IL+ of the inductor current IL sensed in switch S1 by a current sensing circuit 472. Current sensing circuit 472 may operate by buffering the voltage dropped across a sense resistor in series with S1, or may alternatively comprise a current-mirror arrangement including S1. This sensed current is also applied to a second comparator 474 which has a reference input corresponding to zero current, and a logic signal ILZ+ is fed by this comparator into sequencer 462. The current through S4 might be sensed instead of S1, if preferred.

As shown in broken lines, an additional 'panic' signal can be input to the sequencer by a third comparator 476 which compares the sensed voltage at V3+ with a 'panic' reference level VPANIC. (This circuitry is optional and its operation will be described separately, after the main features of operation have been described with reference also to FIG. 8.)

A second potential divider comprising resistors R2a and R2b is connected across the low side output terminals to produce at terminal V3− a scaled version of the actual low side output voltage. A low side voltage sensing path comprises a level shifter 478 a second differential input amplifier 480, a low side error filter 482, and a fourth comparator 484 processes this sensed voltage to feed a logic signal CD− to the sequencer 462. Comparator 480 has a reference input connected to the source of reference voltage Vref. Comparator 484 has its reference input connected to receive a representation IL− of the inductor current IL sensed in switch S2 (or S6) by a current sensing circuit 486. This sensed current is also applied to a fifth comparator 488 which has a reference input corresponding to zero current, and a logic signal ILZ− is fed by this comparator into sequencer 462.

FIG. 7b shows a possible implementation of level shifter 478. The input voltage is applied to an op-amp configured as a voltage follower, connected to a resistor RLS, which is connected in turn to a current source of defined value Isource. The output voltage is taken from the common node of the current source and the resistor. In operation, the resistor will have a constant I.R drop VLS=Isource.RLS. This will cause the voltage at the output to follow the signal at the op-amp output, but level shifted in a positive direction by the voltage VLS.

In operation, the attenuated positive output voltage V3+ derived from V2+ (for convenience of voltage level) is compared to a reference voltage Vref and the resulting error signal E+ is passed through filter 468 to give a filtered error signal FE+. The current in the inductor is sensed (during Phase A) by sensing the current through switch S1 to give sensed-current signal IL+. This signal IL+ is compared with zero, to give a logic signal ILZ+ indicating the polarity of the inductor current: this signal may be used to flag that this current has decayed to zero. IL+ is also compared with FE+ to give a signal CD+ denoting whether the sensed inductor current IL+ is less than or greater than the filtered high side error signal FE+. The meaning of this comparison will be made clear later in the description.

In the low side sensing path, level shifter 478 translates the attenuated negative output voltage V3− to provide a positive voltage for convenient comparison with reference Vref. This allows the control circuitry to operate from a convenient single positive supply such as V1. In this signal path the inductor current during Phase D is conveniently sensed in switch S2, giving a sensed-current signal IL−. Signal ILZ− indicates the polarity of the inductor current: this signal may be used to flag when IL− has decayed to zero, while signal CD− indicates that the inductor current IL− exceeds the low side filtered error signal FE−.

Since the sequencer cycles at a frequency much greater than the signal frequency of the powered circuitry (for example audio frequency), it will be expected that demand at any given time will be predominantly on either the high side or the low side, alternating as the audio signal alternates between positive and negative excursions. Many different control strategies and physical implementations are possible.

In the present embodiment, the policy chosen is broadly to alternate sub-cycles of each type at a constant rate, adapting the charge delivered in each sub-cycle according to the demand on each side. This minimises noise in the output supply voltages, maximising smoothness of the output waveform at times of low and moderate demand. The transition between sub-cycles is synchronised with a regular clock pulse, while the individual phase transitions within each sub-cycle are controlled asynchronously. As shown in FIG. 6, the clock waveform may be asymmetrical, with a duty ratio designed to maximise efficiency in view of the many asymmetries present in the circuit, the operating voltages, and possibly expected asymmetry in the demand from the load.

FIG. 8 is a state transition diagram showing how the sensory inputs generated by the circuitry shown in FIG. 7*a* are used within sequencer 462 to set the switch control signals CS1, CS2, CS4, CS6 and CS7 to control the progression of phases A to F such that the two output voltages are kept close to their desired values as demand varies at each side of the load. The six states labelled A to F on the state diagram correspond to the Phases A to F in the operation of the switch network as already described, and the states of the switch control signals CS1 to CS7 in each phase are defined so as to achieve the switch states shown in the respective drawings FIGS. 5*a* to 5*f*. The arrows on the state transition diagram indicate transitions between states which are triggered by the logical conditions written beside each one. Some of the transitions are indicated with broken lines, and represent refinements to cover special situations that may arise in a practical implementation. Normal operation, indicated by the solid transition lines, will be described first.

Sequencer 462 in normal operation repeatedly cycles through Phases (states) A to F, thereby defining Phases A to F shown in the waveform diagram. Following a clock transition from '1' to '0', the circuit starts in Phase A (corresponding to FIG. 5*a*) and stays in that state while the sensed inductor current IL+ is less than the peak inductor current demand signal FE+. Once IL+ rises to equal FE+, the circuit is switched into positive output charging Phase B. The circuit then remains in Phase B so long as IL+ is greater than zero. Once IL+ has ramped down to zero, the circuit is switched into an idle state C. It remains in state C until the next transition of clock CLK from 0 to 1, when it is switched into the first phase of the low side charging sub-cycle, namely Phase D, charging up the inductor L from capacitor C1 in preparation for supplying capacitor C2. The circuit remains in Phase D until the sensed inductor current IL− has ramped up in magnitude to equal FE−. At that time the circuit is switched into the state shown in FIG. 5*e* and Phase E begins. (Note that IL− and FE− are both negative signals, so the actual condition for this state transition is correctly stated as IL−<FE−.) The circuit then remains in Phase E until the inductor current has decayed to zero, when it is switched into the idle state (Phase F). After completing the low side sub-cycle the circuit is switched back into Phase A when CLK transitions from 1 to 0.

In this way, each of the feedback signal paths (high side and low side) acts similarly to a conventional current-mode control loop. The feedback paths act so that the voltage error modulates FE+ or FE−. FE+ and FE− may thus be regarded as demand signals, and the peak inductor current in each sub-cycle (Imax+ and Imax−) is set in proportion to the respective demand signal by using the output of comparator 470 to trigger the end of Phase A and transition into Phase B. Specifically, by comparing the filtered error signal FE+ with the instantaneous inductor current IL+ as it builds up during Phase A, comparator 470 produces a signal CD+ which can be used to adjust the point in time at which Phase A ends, allowing more current to build up in the inductor in Phase A if the output voltage V2+ is far below the target value than if it is only slightly below. This allows a greater total charge transfer into capacitor C1 over both phases A and B when demand is high. The filter is necessary to reduce the feedback loop unity gain bandwidth to assure stability. Similarly signal FE− determines the inductor current level at which the end of Phase D will be triggered. Again a filter 482 is necessary to reduce the loop unity gain bandwidth to assure stability.

Deviating from the 'normal' operation just described, robust control requires some extra transition possibilities, including for example those illustrated by broken lines in FIG. 8. As mentioned already, demand in typical applications will often be highly asymmetric, and fault conditions can always arise. Accordingly, from Phase A, if the current still has not ramped up to FE+ by the time CLK changes from 0 to 1, the circuit is switched into Phase B to ramp the current down again to zero before passing through Phase C to the negative inductor charging Phase D. Depending on the load on the low-side output, there may not need to be a Phase D and E, or there may be enough time remaining for this to occur. If there is not enough time, then these low side phases may similarly spill into the next half clock period, with Phase D terminated when CLK switches from '1' to '0', as shown by the dotted path from Phase D, and transition out of Phase E delayed until IL− decays to zero.

From Phase F, a transitory state F' is defined from which, if FE+ is less than zero, the circuit is switched directly to Phase C rather than Phase A. This is done so that the circuit will simply miss a high side sub-cycle rather than risk FE+ going high and requesting a burst of current just before the end of the sub-cycle period. Corresponding extra paths and transitory state C' are provided in relation to the low side sub-cycles and the feedback FE− from the negative side of the output supply. Extra control may also be added, for example to limit peak inductor current, by interrupting charging if the sensed inductor current exceeds some predetermined limit. This could be implemented by putting a limiter on the value of FE+ and FE−, instead of additional tests and state transitions.

The additional feedback path using reference VPANIC is an added feature that can be provided to cope with a fault mode in which the low-side load demands a greater current than the regulator can supply. In this case, both the low-side and the high-side supply voltages will tend to droop. Since the energy that the high-side can supply to the low-side per cycle depends on the voltage across the inductor in the charging phase D, its capacity to charge the low side decreases as the high-side supply droops. There is therefore the danger that, even when the low-side demand returns to its "normal" maximum, the high-side supply will still not be able to supply enough energy per cycle, and the system may lock up, with the high-side supply getting lower and lower. To counter this risk, a "panic" threshold is set, somewhat lower than Vref, below which the high-side demand will be fulfilled by extra logic in sequencer 462, regardless of demand indicated by the low-side feedback path. In this way, at least the high-side may stay at a reasonably normal voltage, ready for a clean recovery once the excessive demand goes away.

Figure 9:
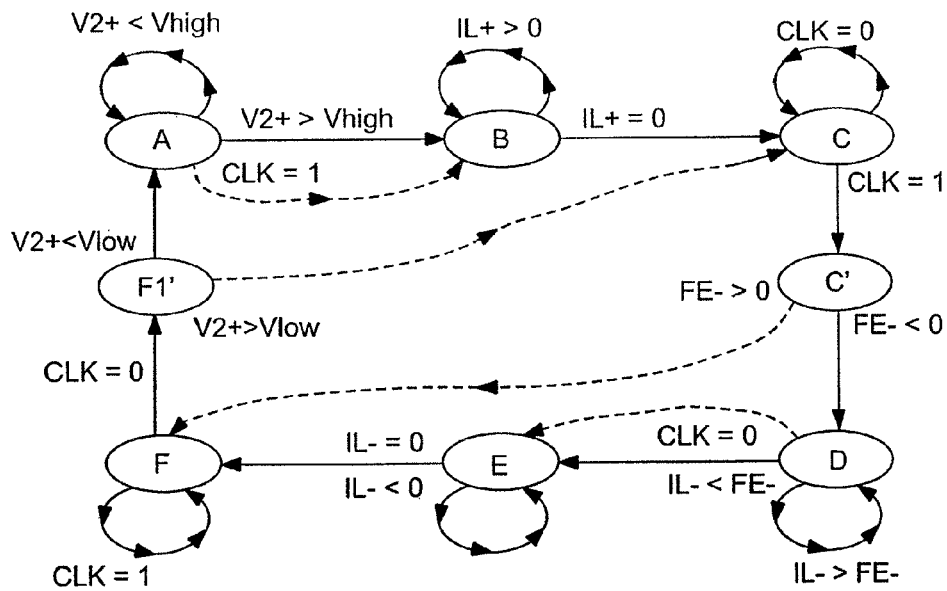
FIG. 9 is a state transition diagram implemented in a second embodiment of the invention, having the same configuration as FIG. 4 but a different control circuit.
Figure 10:
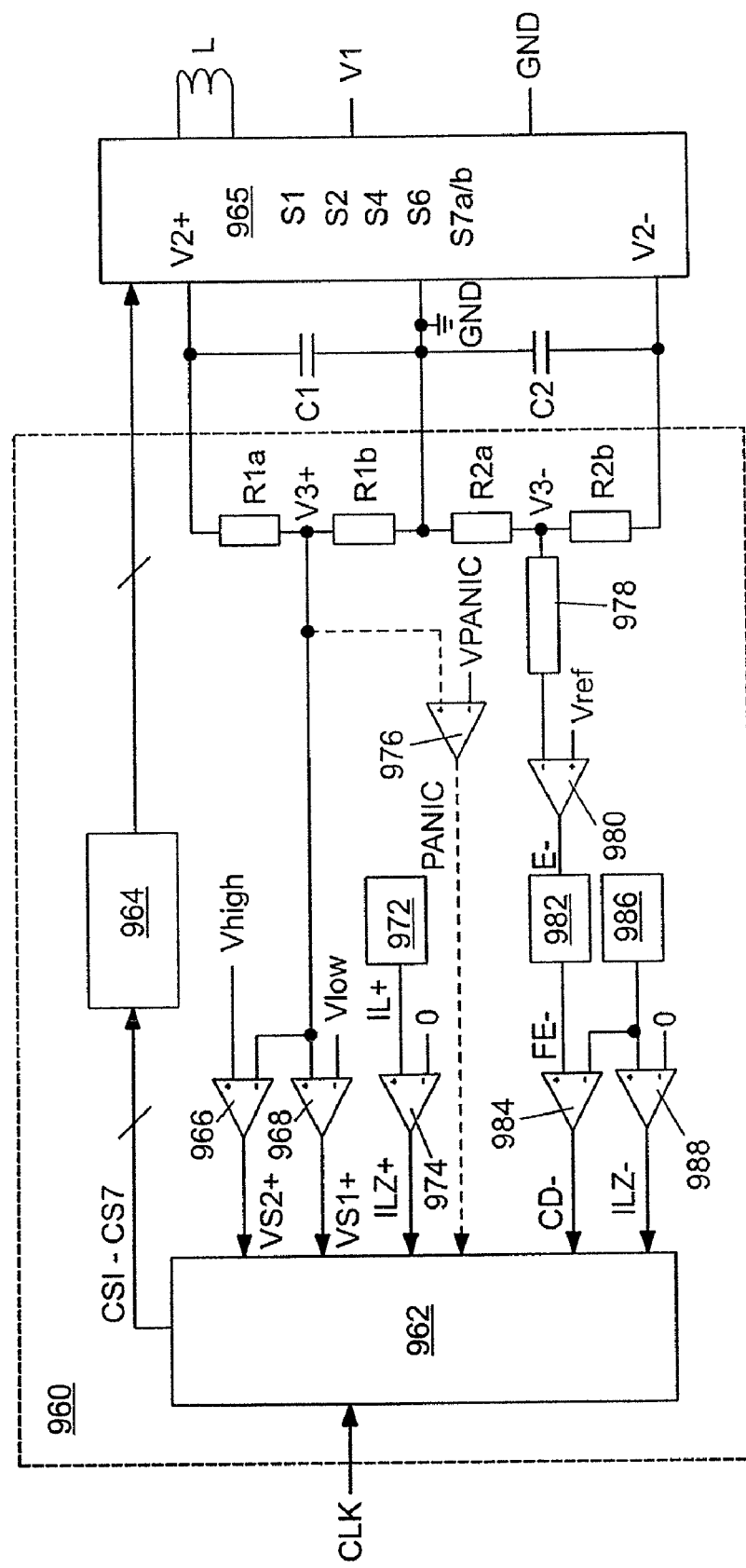
FIG. 10 shows in more detail a modified control circuit used in the second embodiment of the invention.

FIG. 9 is a state diagram for an alternative control loop strategy, using the same switch network. FIG. 10 shows a modified feedback arrangement to be used with this state diagram, instead of the arrangement of FIG. 7*a*. The same reference signs are used where the structure and function has elements in common with the circuit of FIG. 7*a*, but prefixed '9' instead of '4' to distinguish the embodiments. Thus the controller 960 replaces controller 460, while modified sequencer is numbered 962 instead of 462, for example. The common elements will not be described further. It will be seen that differences are mainly in the high side path, where the elements 466, 468 and 470 are replaced by a pair of comparators 966 and 968 which generate output logic signals VS1+ and VS2+ respectively for use by the sequencer 962. An upper threshold voltage Vhigh is applied to the non-inverting input of comparator 966, while the signal at V3+, representing the high side output voltage V2+, is applied to the inverting input of comparator 966. Conversely, a lower threshold voltage Vlow is applied to the inverting input of comparator 968, while the signal at V3+ is applied to the non-inverting input of comparator 968. The 'panic' path is again provided as an optional feature.

The provision of upper and lower threshold detectors in the positive feedback path enables the high side charging to be controlled in a hysteretic fashion, whereby the attenuated output voltage V3+ is compared instantaneously against upper threshold Vhigh and lower threshold Vlow. Referring also to the state transition diagram of FIG. 9, it can be seen that, at the rising edge of the clock, the inductor is charged only if condition V3+<Vlow is satisfied. From there, inductor charging continues until V3+ exceeds Vhigh, when the inductor is discharged until the sensed current has ramped down to zero. This gives a simpler control circuit, but one where careful attention is needed in the design to maintain stability. It will be understood that the thresholds Vlow and Vhigh actually applied to the comparator inputs are set in accordance with the scaling factor of the potential divider R1*a*/R1*b* for comparison with V3+, but are scaled up when represented on the waveform diagrams, for comparison with the actual value of V2+.

Figure 11:
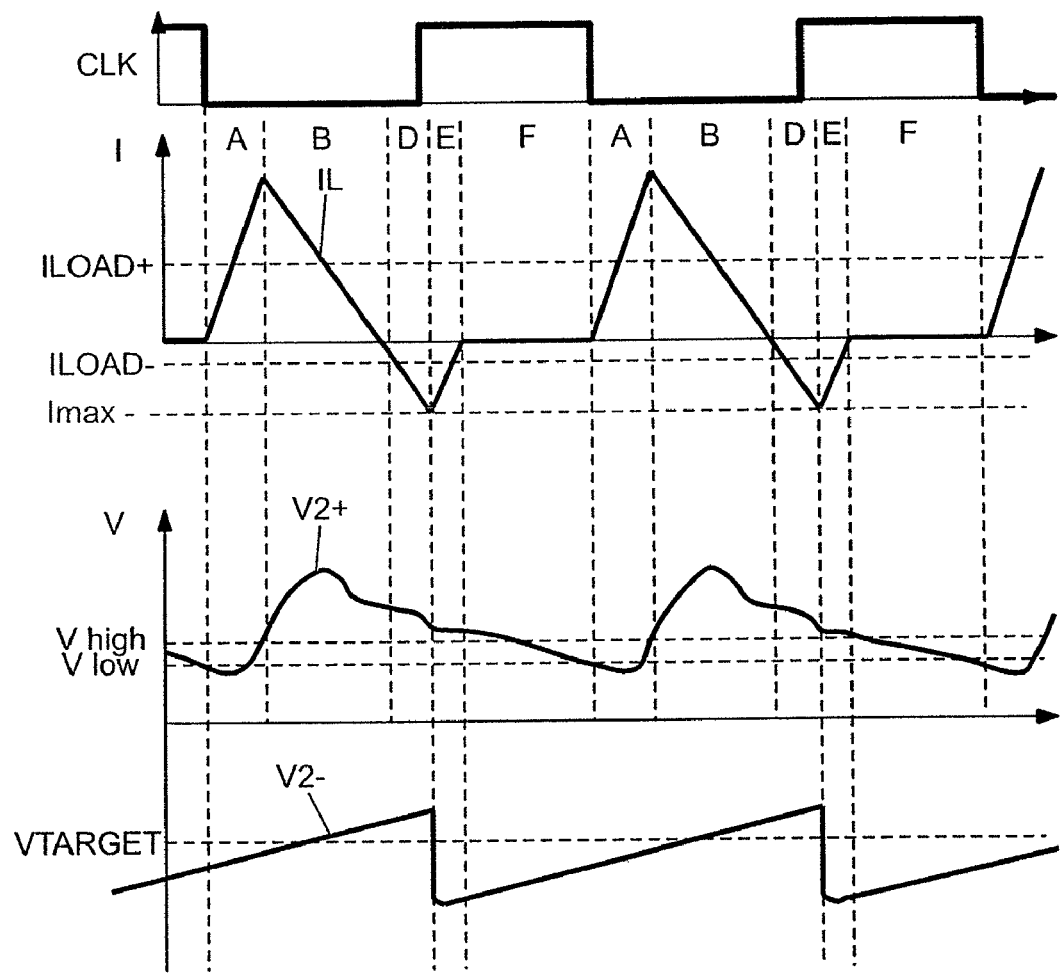
FIG. 11 shows waveforms present in a third embodiment of the invention, based on further modification of the FIGS. 9 and 10 embodiment.

FIG. 11 illustrates waveforms depicting a yet further possible mode of operation of the DC-DC converter 400. State transition rules and feedback paths can be generated readily by a designer wishing to implement this mode of operation, based on the principles illustrated in the previous examples. The waveforms of FIG. 11 illustrate the result of applying state transition conditions in which the 0-1 transition of signal CLK is ignored and idle state C is omitted, the circuit normally passing from state B directly to state D. This reflects the observation that the switch states in Phases B and D are in fact identical, avoids the need to toggle switch S4 or S7*b* merely to create an idle state C, and allows more freedom of duty cycle between the positive and negative sub-cycles and their respective charging times. In this diagram, the high side switching is determined by hysteretic thresholds Vhigh and Vlow as above. The low-side output V2− is shown in relation to a target value VTARGET−, although its switching may be determined by a signal CD− and ILZ− as described above. A reference signal defining VTARGET− may be derived from Vref via a level shifter and resistor divider.

Many different sets of rules and feedback paths are possible, each with its own advantages and disadvantages in a given application. Further variations are described below.

The modes of operation described so far have assumed charging positive and negative outputs in alternate sub-cycles, albeit with the possibility of an empty sub-cycle in case of no demand. Other schemes are possible in which sub-cycles of the same type can be concatenated in case of high demand from one side or the other. This effectively implements the 'continuous mode' of operation known in DC-DC converters generally, in which a new sub-cycle can be started without requiring the inductor current to return to zero. This continuous mode operation is possible between sub-cycles of the same type (successive cycles charging the high side, or successive cycles charging the low side). The main constraint is that the continuous mode should be ended and the inductor current returned to zero before a sub-cycle of the opposite type is started.

Figure 12:
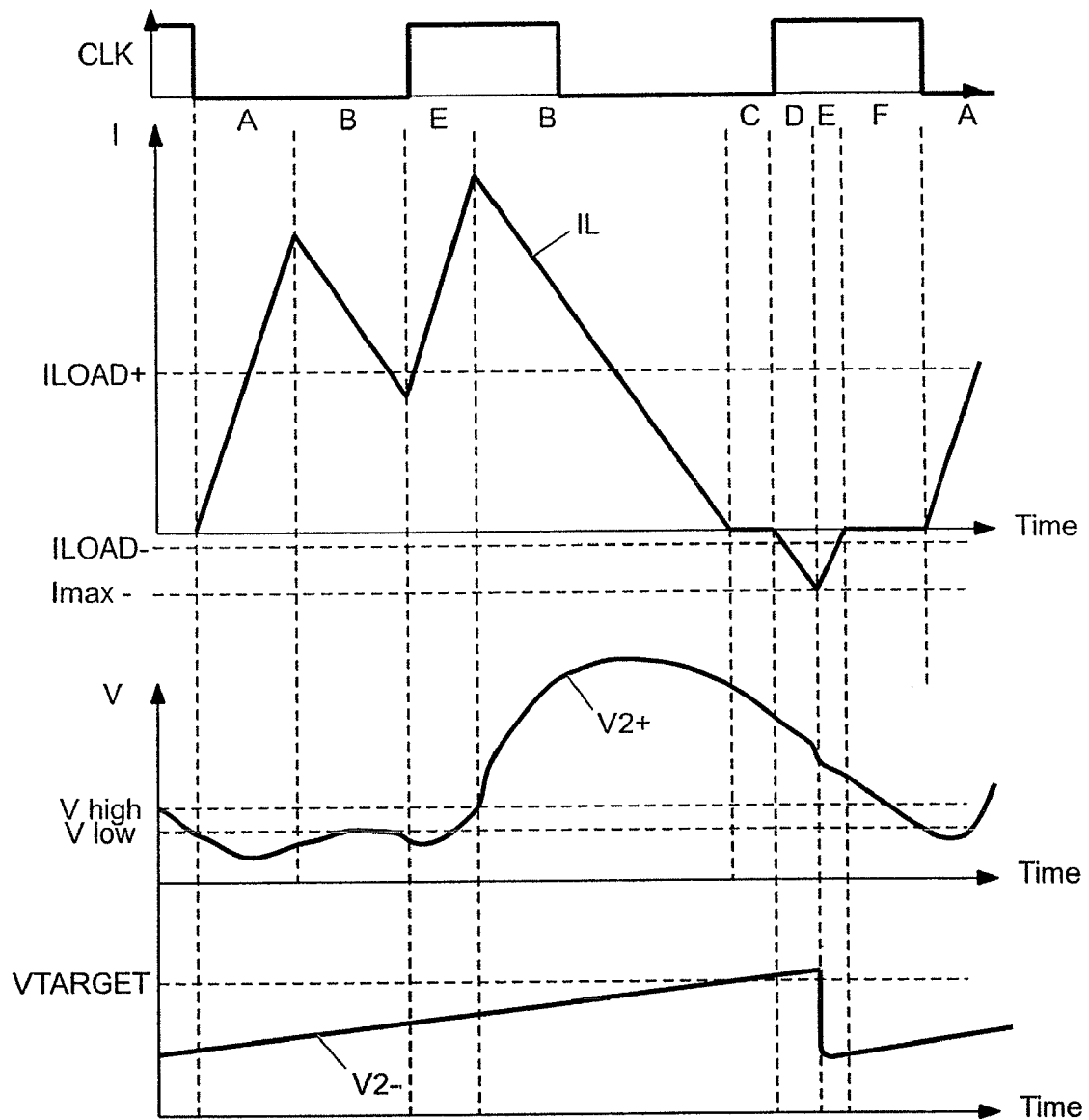
FIG. 12 shows waveforms present in a fourth embodiment of the invention.

FIG. 12 illustrates waveforms for one such scheme wherein, at each clock transition, the voltage errors for V2+ and V2− are compared, and the output requiring the greater re-charge is selected. At the first transition illustrated in the example waveforms, V2+ is lower (less positive) than its lower target Vlow but V2− is actually below (more negative) than its target VTARGET− so actually needs no re-charge, so Phase A is selected. At the next transition, V2− is slightly positive, but V2+ is still a long way from its target, so Phase A is selected, to boost the inductor current even though it is still not zero. At the third transition, V2+ has overshot positive, while V2− has drooped, so the device does not switch back to Phase A, but continues in Phase B until the current drops to zero and it can drop idle Phase C until the next rising clock edge. The transitions from Phase A to Phase B and Phase D to Phase E are governed by the filtered error signal, FE− in this example. Again, all manner of refinements are possible, for example, to double the speed of the clock or equivalent measures, so that the circuit doesn't have to wait until the "right" sub-cycle to switch which side it is charging.

In many applications, the output voltages wanted will be constant. It should be appreciated, however, that the output voltages V2+ and V2− can be controlled to vary over time. This can be done very simply by varying the reference voltages Vref and so forth, that are applied at various points in the feedback control circuits described above. It may be easier alternatively to vary the ratios of the potential dividers R1*a*/R1*b* and R2*a*/R2*b* instead, to achieve an equivalent effect, or both techniques could be used in combination. The variation may be manually controlled, or controlled automatically according to some desired behaviour.

Many other modifications in the control scheme, the form of the controller 460 and even specifics of the switch network may be varied. The skilled reader will appreciate that the above and other modifications and additions are possible to these circuits, without departing from the spirit and scope of the invention as defined in the appended claims. Accordingly, the above described embodiments are presented to illustrate rather than limit the scope of the invention. For interpreting this specification and claims, the reader should note that the word "comprising" does not exclude the presence of elements or steps other than those listed in a claim, the singular article "a" or "an" does not exclude a plurality, and a single element may fulfil the functions of several elements recited in the claims. Any reference signs in the claims shall not be construed so as to limit their scope.

Where a claim recites that elements are "connected" or are "for connecting", this is not to be interpreted as requiring direct connection to the exclusion of any other element, but rather connection sufficient to enable those elements to function as described. The skilled reader will appreciate that a good, practical design might include many auxiliary components not mentioned here, performing, for example, start-up and shutdown functions, sensing functions, fault protection or the like, some of which have been mentioned already, and none of which detract from the basic functions characteristic of the invention in its various embodiments described above in the claims.

In addition to variations and modifications within the DC-DC converter circuit itself, the invention encompasses all manner of apparatuses and systems incorporating the DC-DC converter, besides the headphone amplifier application illustrated in FIG. 2. The circuit may be used to power output stages of all manner of apparatus, including communications apparatus, where the output stage may drive an antenna or transmission line, an electro-optical transducer (light emitting device) or electromechanical transducer. In all these fields of application, particularly battery or line-powered devices, the benefits of minimum size and cost which the invention permits are increasingly important.

What is claimed is:

1. An integrated circuit for use in DC-DC converter circuit having a voltage input for connection to a voltage supply, first and second voltage outputs and a common node, and first and second inductor nodes for connection to an inductor, the integrated circuit comprising a network of switches operable in a plurality of states including:
   a first state in which the first and second inductor nodes are connected to the voltage input and the first output respectively;
   a second state in which the first inductor node is connected to the common node and the second inductor node is connected to the first output;
   a third state in which the first inductor node is connected to the common node and second inductor node is connected to the second output.

2. An integrated circuit as claimed in claim 1 further comprising a controller arranged to receive feedback signals derived from said voltage outputs and in response to said feedback signals to initiate at least two different types of charging cycle, each type of cycle comprising a plurality of phases, each phase having the switch network controlled into a specific one of said states, whereby the first and second outputs in operation will be maintained at or around respective target voltages, the voltages on the first and second outputs having opposite polarities relative to the common node.

3. An integrated circuit as claimed in claim 2 wherein said charging cycles comprise (i) a first type of charging cycle for generating a first voltage at the first voltage output in which the switch network is placed firstly in said first state and subsequently placed in said second state and (ii) a second type of charging cycle for generating a second voltage at the second voltage output in which the switch network is placed firstly in said second state and subsequently placed in said third state.

4. An integrated circuit as claimed in claim 1 wherein said switch network comprises four individually controllable switches which are sufficient to make the connections specified to define said first, second and third states.

5. An integrated circuit as claimed in claim 4 wherein said four switches comprise: a first switch for connecting the voltage input to the first inductor node, a second switch for connecting the first inductor node to the common node, a third switch for connecting the second inductor node to the first voltage output and a fourth switch for connecting the second inductor node to the second voltage output.

6. An integrated circuit as claimed in claim 1 wherein said switch network is further operable in a fourth state in which neither of the inductor nodes is connected to the first or second voltage outputs.

7. An integrated circuit as claimed in claim 6 wherein in said fourth state the first inductor node is connected to the common node.

8. An integrated circuit as claimed in claim 6 wherein in said fourth state the first inductor node is connected to the second inductor node.

9. An integrated circuit as claimed in claim 8 wherein the switch network further comprises an additional switch for making the connection between said first and second inductor nodes in said fourth state.

10. An integrated circuit as claimed in claim 9 wherein said additional switch is of smaller physical area than switches of the network which are involved in making the connections specified for the first, second and third states.

11. An integrated circuit as claimed in claim 1 further including functional circuitry connected to be powered by said DC-DC converter.

12. An integrated circuit as claimed in claim 11 wherein said functional circuitry includes comprises at least one of: an audio amplifier; communication circuitry; a line driver; an antenna driver and circuitry handling video signals.

13. An integrated circuit as claimed in claim 1 wherein, in operation, the voltage at the first voltage output is of opposite polarity to the voltage at the second voltage output, relative to the voltage at the common node.

14. An integrated circuit as claimed in claim 1 wherein said first and second inductor nodes comprises inductor terminals for connection to an off chip inductor.

15. An electronic apparatus comprising an integrated circuit as claimed in claim 1.

16. An electronic apparatus as claimed in claim 15 wherein said electronic apparatus is at least one of: a portable apparatus, an audio apparatus, a mobile telephone apparatus; a modem; an MP3 player.

17. A method of DC-DC conversion comprising operating a switch network that interconnects a voltage supply input, first and second voltage outputs, a common node and first and second inductor nodes connected to an inductor, the method comprising operating the switch network to generate a plurality of states including:
   a first state in which the first and second inductor nodes are connected to the voltage input and the first output respectively;
   a second state in which the first inductor node is connected to the common node and the second inductor node is connected to the first output;
   a third state in which the first inductor node is connected to the common node and second inductor node is connected to the second output.

18. A DC-DC converter circuit comprising:

a voltage input for connection to a voltage supply, a first voltage output for outputting a voltage of the same polarity as the voltage supply and a second voltage output for outputting a voltage of the opposite polarity to the voltage supply; a common node, first and second inductor nodes for connection to an inductor, and a network of switches, wherein said network of switches is operable in a plurality of states including a first state in which the first inductor node is connected to the common node and the second inductor node is connected to the first output followed by a second state in which the first inductor node is connected to the common node and second inductor node is connected to the second output.

* * * * *